(12) United States Patent
Sakurai

(10) Patent No.: US 9,250,790 B2
(45) Date of Patent: Feb. 2, 2016

(54) INFORMATION PROCESSING DEVICE, METHOD OF PROCESSING INFORMATION, AND COMPUTER PROGRAM STORAGE DEVICE

(75) Inventor: Atsushi Sakurai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 310 days.

(21) Appl. No.: 13/280,388

(22) Filed: Oct. 25, 2011

(65) Prior Publication Data

US 2012/0162105 A1 Jun. 28, 2012

(30) Foreign Application Priority Data

Dec. 24, 2010 (JP) .................................. 2010-287451

(51) Int. Cl.
*G06F 3/041* (2006.01)
*G06F 3/0488* (2013.01)

(52) U.S. Cl.
CPC .................................... *G06F 3/0488* (2013.01)

(58) Field of Classification Search
CPC ......... G06F 3/041; G06F 1/32; G06F 3/0488; G06F 2203/04101; G06F 2203/04106
USPC ...................... 345/173–178; 178/18.01–18.09
See application file for complete search history.

(56) References Cited

U.S. PATENT DOCUMENTS

2009/0244019 A1 10/2009 Choi
2009/0251434 A1* 10/2009 Rimon et al. ................. 345/173
2010/0020035 A1* 1/2010 Ryu et al. ...................... 345/173
2010/0026723 A1* 2/2010 Nishihara et al. ............. 345/671
2010/0107099 A1 4/2010 Frazier et al.
2011/0041096 A1* 2/2011 Larco et al. ................... 715/835
2011/0057890 A1* 3/2011 Goo et al. ..................... 345/173
2011/0175827 A1* 7/2011 Bogue ........................... 345/173

FOREIGN PATENT DOCUMENTS

| EP | 2 105 827 A2 | 9/2009 |
|---|---|---|
| JP | 7-13676 A | 1/1995 |
| JP | 2006-171854 A | 6/2006 |
| JP | 2008-33701 | 2/2008 |
| JP | 2008-505379 A | 2/2008 |
| JP | 2009-3575 A | 1/2009 |

OTHER PUBLICATIONS

Extended European Search Report issued Mar. 23, 2012 in Patent Application No. 11192870.1.
Office Action issued Jul. 24, 2014 in Japanese Patent Application No. 2010-287451.

* cited by examiner

*Primary Examiner* — Amare Mengistu
*Assistant Examiner* — Stacy Khoo
(74) *Attorney, Agent, or Firm* — Hazuki International, LLC

(57) ABSTRACT

An information processing device, method and computer program storage device that cooperate to handle different user interface situations differently. An exemplary device detects an external object as being in a touch state when and external object is in contact with a detection surface, and an adjacent state when the external object is within a predetermined distance from said detection surface but not in contact with said detection surface. A processor, when operating in a first mode, processes the touch state differently than the adjacent state. Also, the processor when operating in a second mode, processes said adjacent state as if it was the touch state.

20 Claims, 19 Drawing Sheets

OFF (FAR-LOCATED STATE)

HOVER (ADJACENT STATE)

TOUCH (TOUCH STATE)

HOVER MOVE (ADJACENT MOVE STATE)

TOUCH MOVE (TOUCH MOVE STATE)

FIG.5

| EVENT | OFF | HOVER | TOUCH | HOVER MOVE | TOUCH MOVE |
|---|---|---|---|---|---|
| STATE | FAR-LOCATED STATE | ADJACENT STATE | TOUCH STATE | ADJACENT MOVE STATE | TOUCH MOVE STATE |
| DESCRIPTION | STATE IN WHICH NO OBJECT IS RECOGNIZED TO BE PRESENT AT TOUCH PANEL | STATE IN WHICH APPROXIMATE POSITION ABOVE TOUCH PANEL CAN BE RECOGNIZED (X1,Y1,Z?) | STATE IN WHICH TOUCH POSITION ON TOUCH PANEL CAN BE RECOGNIZED (X1,Y1,0) | STATE IN WHICH THERE IS MOVEMENT IN HORIZONTAL DIRECTION IN ADJACENT STATE | STATE IN WHICH THERE IS MOVEMENT IN HORIZONTAL DIRECTION IN TOUCH STATE |

OFF
(FAR-LOCATED STATE)

PROXIMITY
(PROXIMITY STATE)

HOVER
(ADJACENT STATE)

TOUCH
(TOUCH STATE)

FIG.16

| EVENT | OFF | PROXIMITY | HOVER | TOUCH | HOVER MOVE | TOUCH MOVE |
|---|---|---|---|---|---|---|
| STATE | FAR-LOCATED STATE | PROXIMITY STATE | ADJACENT STATE | TOUCH STATE | ADJACENT MOVE STATE | TOUCH MOVE STATE |
| DESCRIPTION | STATE IN WHICH NO OBJECT IS RECOGNIZED TO BE PRESENT AT TOUCH PANEL | STATE IN WHICH CHARGED OBJECT IS RECOGNIZED TO BE PRESENT ABOVE TOUCH PANEL | STATE IN WHICH APPROXIMATE POSITION ABOVE TOUCH PANEL CAN BE RECOGNIZED (X1,Y1,Z?) | STATE IN WHICH TOUCH POSITION ON TOUCH PANEL CAN BE RECOGNIZED (X1,Y1,0) | STATE IN WHICH THERE IS MOVEMENT IN HORIZONTAL DIRECTION IN ADJACENT STATE | STATE IN WHICH THERE IS MOVEMENT IN HORIZONTAL DIRECTION IN TOUCH STATE |

FIG.24

|  | MULTI-TOUCH MODE OFF | MULTI-TOUCH MODE ON |
|---|---|---|
| GLOVE-OPERATED MODE OFF | COMMON OPERATION MODE | MULTI-TOUCH OPERATION MODE (MULTI-POINT OPERATION CAN BE PERFORMED ON TOUCH REGION) |
| GLOVE-OPERATED MODE ON | GLOVE-OPERATED MODE (OPERATION CAN BE PERFORMED ABOVE HOVER REGION) | HOVER MOVE (TENTATIVE NAME) OPERATION MODE (MULTI-POINT OPERATION CAN BE PERFORMED ABOVE HOVER REGION) |

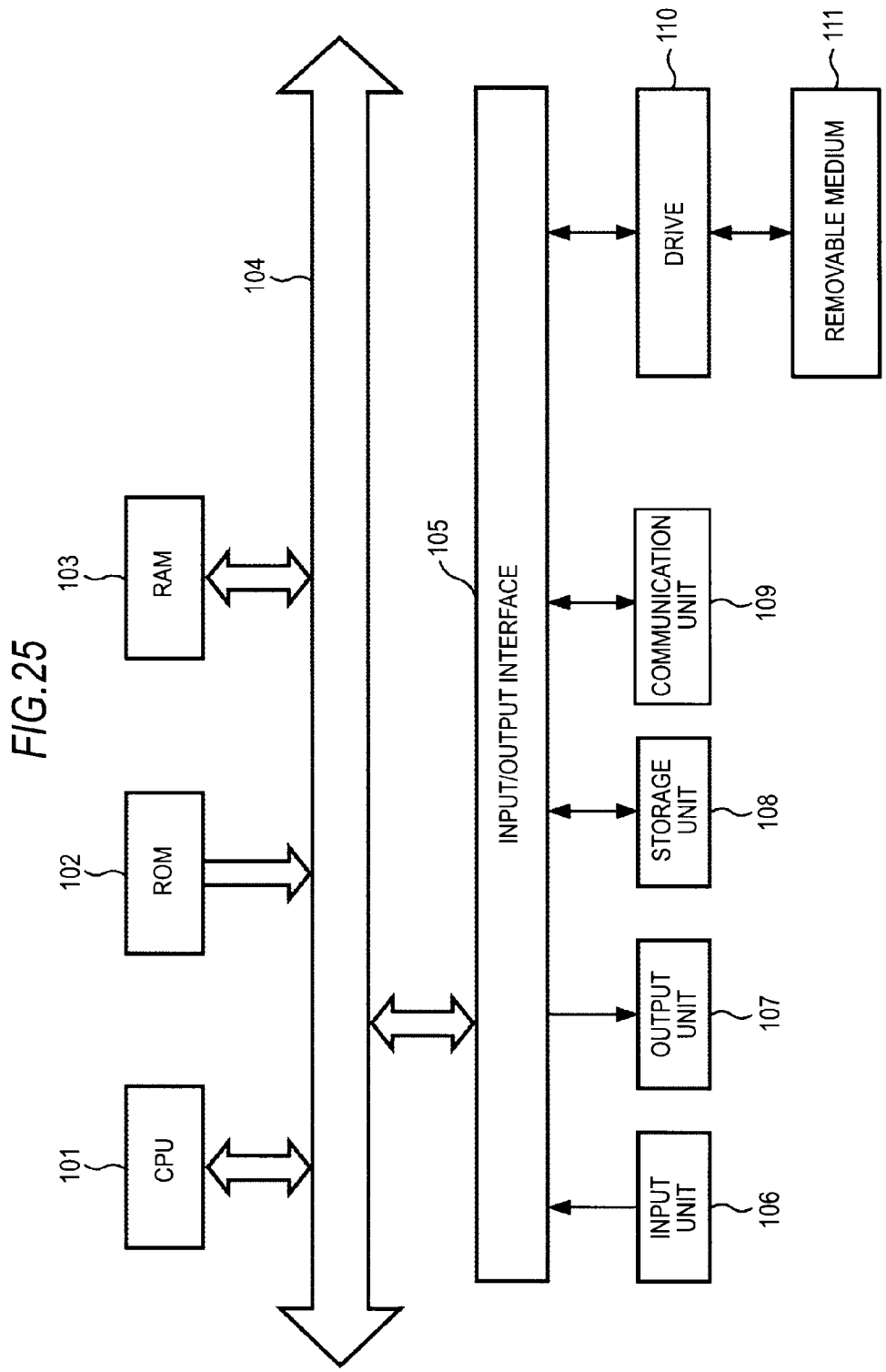

INFORMATION PROCESSING DEVICE, METHOD OF PROCESSING INFORMATION, AND COMPUTER PROGRAM STORAGE DEVICE

TECHNICAL FIELD

The present disclosure relates to an information processing device, a method of processing information, and a computer program storage device, and more particularly, to an information processing device, a method of processing information, and computer program storage device having a program capable of performing a same operation as that in the case of bare hands even in a case where gloves are worn.

BACKGROUND

Recently, as input interfaces of mobile terminals such as cellular phones or digital cameras, touch panels are frequently used. As the types of touch panel, there are a capacitive type, a resistive type, an infrared ray shielding type, and the like.

For example, in a capacitive-type touch panel, the position of a finger is detected by detecting a change in the electrostatic capacity by using electrodes arranged at each position. The electrostatic capacity of the electrode increases as an object causing a change in the electrostatic capacity such as a finger approaches. On the other hand, the electrostatic capacity of the electrode decreases as the object is located farther away.

As above, in a terminal having the capacitive-type touch panel, generally, the function is realized by detecting a touch on a touch panel based on the magnitude of the electrostatic capacity.

However, in a case where a user wears a glove, and it is difficult to touch the touch panel with a bare hand, the electrostatic capacity does not change even when the touch panel is touched by the user. Accordingly, it is difficult to detect a user operation.

In order to respond to such a case, there is a technique in which the resistance value of a touch sensor is measured, in a case where the resistance value is greater than a reference value, a user is determined to have worn a glove, and a threshold value used for determining On/Off of a touch panel operation is set to be lower than a case of a bare hand (JP-A-2008-33701). According to such a technique, by setting the threshold value to be lower in a case where the user wears a glove, the sensitivity of the touch panel can be improved.

SUMMARY

In the technique disclosed in JP-A-2008-33701, after the threshold value is set once, it is configured so as to repeatedly check whether or not the touch sensor is touched with a bare hand, and such a process is realized based on one event regarding whether the touch sensor is touched or not. In addition, it is difficult for a user to intentionally switch between a mode in which an operation is performed with a bare hand and a mode in which an operation is performed with a hand wearing a glove.

Thus, it is desirable to perform the same operation as that of the case of a bare hand even in a case where a user is wearing a glove.

In one exemplary embodiment, an information processing device includes
a sensor that detects an external object as being in
a touch state when the external object is in contact with a detection surface, and
an adjacent state when the external object is within a predetermined distance from the detection surface but not in contact with the detection surface; and
a processing circuit that when operating in a first mode processes said touch state as a same state as said adjacent state.

According to an aspect of the embodiment,
when operating in a second mode, the processing circuit processes the touch state differently than the adjacent state.

According to another aspect,
the second mode being selectably disablable, and
when the second mode is disabled, the processing circuit recognizes the touch state and the adjacent state to be effective, and
when the second mode is not disabled, the processing circuit recognizes the touch state as being effective but not the adjacent state.

According to another aspect,
the adjacent state being a hover state in which the external object is moved to within the predetermined non-zero distance from the detection surface.

According to another aspect,
the processing circuit controls a display unit in accordance with the sensor detecting the external object being in the touch state or the adjacent state.

According to another aspect,
the sensor determines the external object as being in a proximity state when the sensor detects the external object being further than the predetermined distance, but less than a proximity threshold distance from the detection surface.

According to another aspect,
the processing circuit is configured to switch between the first mode and the second mode when operating in a single-touch mode or a multi-touch mode.

According to another aspect,
the second mode being selectably disablable, and
when the second mode is disabled, and the multi-touch mode is disabled, the processing circuit operates the information processing device in a common operation mode.

According to another aspect,
the second mode being selectably disablable, and
when the second mode is disabled, and the multi-touch mode is enabled, the processing circuit operates the information processing device in the multi-touch mode.

According to another aspect,
the second mode being selectably disablable, and
when the second mode is enabled, and the multi-touch mode is disabled, the processing circuit operates the information processing device in a glove-operated mode.

According to another aspect,
the second mode being selectably disablable, and
when the second mode is enabled, and the multi-touch mode is enabled, the processing circuit operates the information processing device in a hover mode.

According to another aspect, the device further includes
a touch screen that includes the sensor.

According to another aspect,
the touch screen is incorporated into a smart phone or a tablet computer.

In a method embodiment, the method includes
detecting with a sensor an external object as being in
a touch state when the external object is in contact with a
detection surface, and
an adjacent state when the external object is within a predetermined distance from the detection surface but not in contact with the detection surface; and
operating a processing circuit in a first mode processes the adjacent state as if it was the touch state.

According to one aspect of the method embodiment the method includes,
operating the processing circuit in a second mode where the processing circuit processes the touch state as a separate state than the adjacent state.

According to another aspect,
the second mode being selectably disablable,
when the second mode is disabled, the processing circuit recognizing the touch state and the adjacent state to be effective, and
when the second mode is not disabled, the processing circuit recognizing the touch state as being effective but not the adjacent state.

According to another aspect,
the adjacent state being a hover state in which the external object is moved to within the predetermined non-zero distance from the detection surface.

According to another aspect,
the operating includes controlling a display unit in accordance with the sensor detecting the external object being in the touch state or the adjacent state.

According to another aspect,
the detecting includes the sensor determining the external object as being in a proximity state when the sensor detects the external object being further than the predetermined distance, but less than a proximity threshold distance from the detection surface.

According to a non-transitory computer program storage device embodiment having instructions stored therein that when executed by a processing circuit implements a process that includes
detecting with a sensor an external object as being in
a touch state when the external object is in contact with a
detection surface, and
an adjacent state when the external object is within a predetermined distance from the detection surface but not in contact with the detection surface; and
operating a processing circuit in a first mode processes the adjacent state as if it was the touch state.

According to the embodiments of the present disclosure, a user can perform the same operation as that of the case of a bare hand even in a case where the user is wearing a glove.

BRIEF DESCRIPTION OF THE DRAWINGS

FIG. 5 is a diagram illustrating a user's finger state in each event.

FIG. 16 is a diagram illustrating a user's finger state in each event.

FIG. 24 is a diagram illustrating an example of operation modes.

FIG. 25 is a block diagram illustrating an example of the hardware configuration of a computer.

DETAILED DESCRIPTION

First Embodiment

[Exterior Configuration of Information Processing Device]

Figure 1:
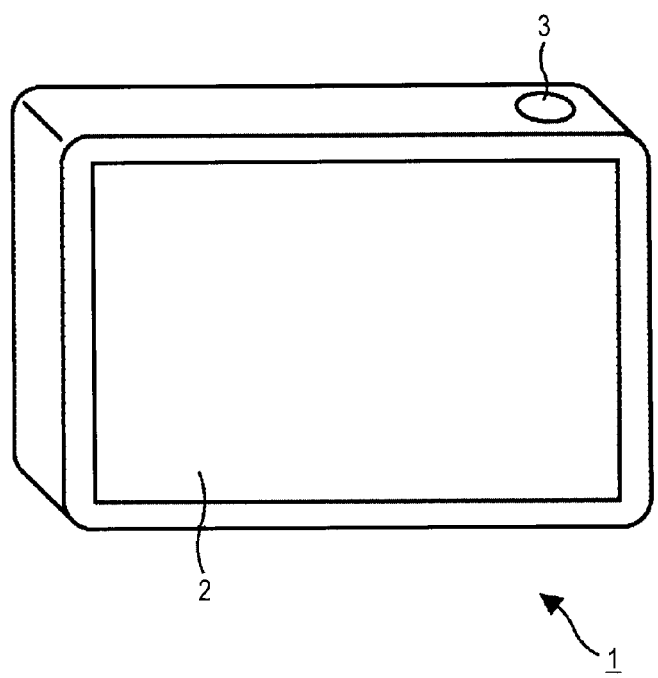
FIG. 1 is a rear-side exterior view of an image processing device according to an embodiment of the present disclosure.

FIG. 1 is a rear-side exterior view of an image processing device 1 according to an embodiment of the present disclosure.

In the example illustrated in FIG. 1, the information processing device 1 is configured as a digital camera that has a plate-shaped casing having a predetermined thickness. On the front side of the information processing device 1 that is not shown in the figure, a lens is disposed, and a display 2 is disposed on almost the entire face of the rear side. On the right side on the top face of the information processing device 1, a shutter button 3 is disposed.

The information processing device 1 is a device in which a touch panel is arranged as a user's input interface. On the front face of the display 2, a touch panel is disposed.

For example, the touch panel that is disposed on the display 2 is a capacitive-type touch panel. In the touch panel, a value of the electrostatic capacity at each position on the display 2 is detected, and a signal that represents a value of the detected electrostatic capacity is output. For example, as an object such as a user's finger that causes a change in the electrostatic capacity gets closer to the front face of the display 2, a signal representing a greater value is output. On the other hand, as such an object gets farther away from the front face of the display 2, a signal representing a smaller value is output.

Figure 2:
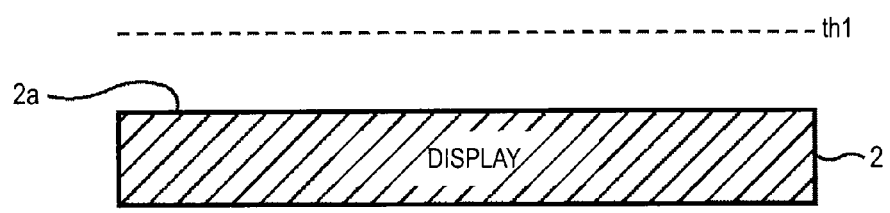
FIG. 2 is a cross-sectional view illustrating the vicinity of the front face of a display.

FIG. 2 is a cross-sectional view illustrating the vicinity of the front face of the display 2. In FIG. 2, the upper face 2a of a rectangle representing the cross-section of the display 2 is on the front face side of the display 2. A signal that represents a distance to a close object such as a user's finger from the front face (the upper side 2a) of the display 2 as a reference is output from the touch panel disposed on the display 2.

Hereinafter, a case will be described in which the object that is adjacent to the display 2 is a user's finger (a bare finger or a finger of a hand wearing a glove). As is denoted by a broken line, a threshold value th1 is set at a position at which the distance from the front face of the display 2 is a predetermined distance.

[Detectable Events]

Figure 3A:
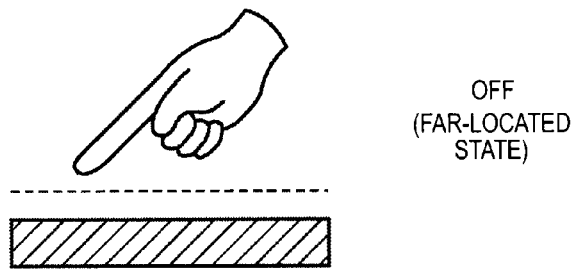
FIGS. 3A to 3C are diagrams illustrating an example of events that can be detected in the information processing device.
Figure 3B:
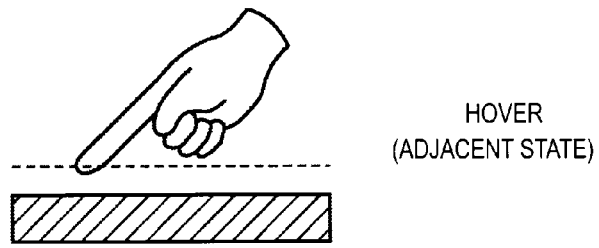
Figure 3C:
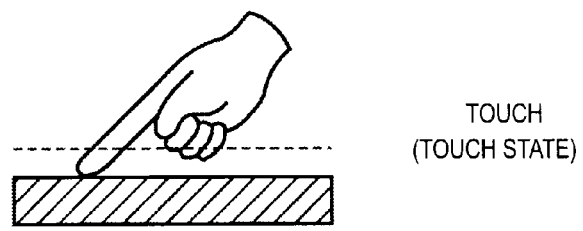

FIGS. 3A to 3C are diagrams illustrating an example of events that can be detected in the information processing device 1.

In a case where the operation mode of the information processing device 1 is a normal mode, a plurality of events such as a hover event (sometimes described as an adjacent state or event) and a touch event can be detected. As will be described later, as the operation modes that are modes relating to operation methods for the information processing device 1, the normal mode and a glove-operated mode are provided. Here, an event represents an input.

In a case where the distance to the user's finger that is represented by a signal output from the touch panel is longer than the threshold value th1, an Event Off is determined in the information processing device 1 (FIG. 3A).

On the other hand, in a case where the distance to the user's finger that is represented by a signal output from the touch panel is shorter than the threshold value th1 although the user's finger is not touching the front face of the display 2, the hover event is detected in the information processing device 1 (FIG. 3B).

On the other hand, in a case where the user's finger is represented to be on the front face of the display 2 by a signal output from the touch panel, in other words, in a case where the user's finger is touching the display 2, a touch event is detected in the image processing device 1 (FIG. 3C).

Figure 4A:
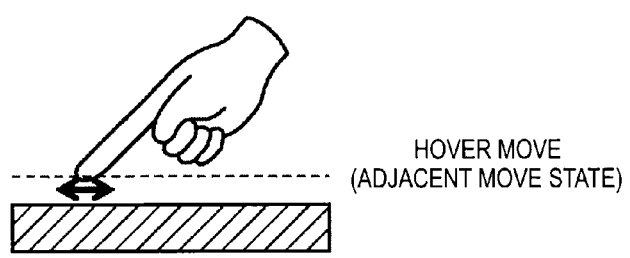
FIGS. 4A and 4B are diagrams illustrating a hover move event and a touch move event.
Figure 4B:
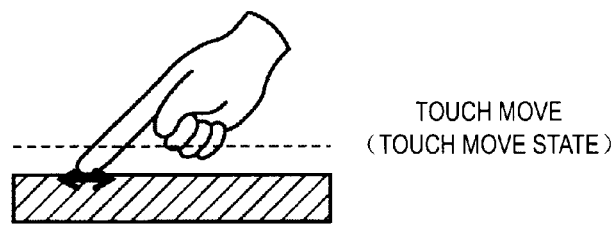

As illustrated in FIG. 4A, in a case where a user's finger is not touching the front face of the display 2 but is closer than the threshold value th1, and the user's finger is moving in that state, a hover move event is detected. On the other hand, as illustrated in FIG. 4B, in a case where the user's finger moves in a state of touching the front face of the display 2, a touch move event is detected.

FIG. 5 is a diagram illustrating a user's finger state in each event.

A case where the event is Off represents a state in which the user's finger is located far away. In such a case, no input to the touch panel is recognized by the information processing device 1.

The hover event represents that the user's finger is in an adjacent state. In such a case, an approximate position of the user's finger located above the display 2 can be recognized by the information processing device 1.

The touch event represents the user's finger in a touching state. In such a case, the position of the user's finger located on the front face of the display 2 can be recognized by the information processing device 1.

The hover move event represents that the user's finger moves in the adjacent state. In such a case, an approximate position of the user's finger moving in the horizontal direction can be recognized by the information processing device 1.

The touch move event represents that the user's finger moves in a touched state. In such a case, the position of the user's finger moving in the horizontal direction can be recognized by the information processing device 1.

When it is considered that the hover move event is included in the hover event, and the touch move event is included in the touch event, the function of the information processing device 1 is realized by detecting two types of events including the hover event and the touch event. The effective event is switched in a case where the operation mode is the normal mode and a case where the operation mode is the glove-operated mode, and, in the normal mode, the hover event and the touch event are distinctively detected, and different processes are performed for each event. The setting of the operation mode can be intentionally performed by a user using a setting screen of a main body.

Figure 6:
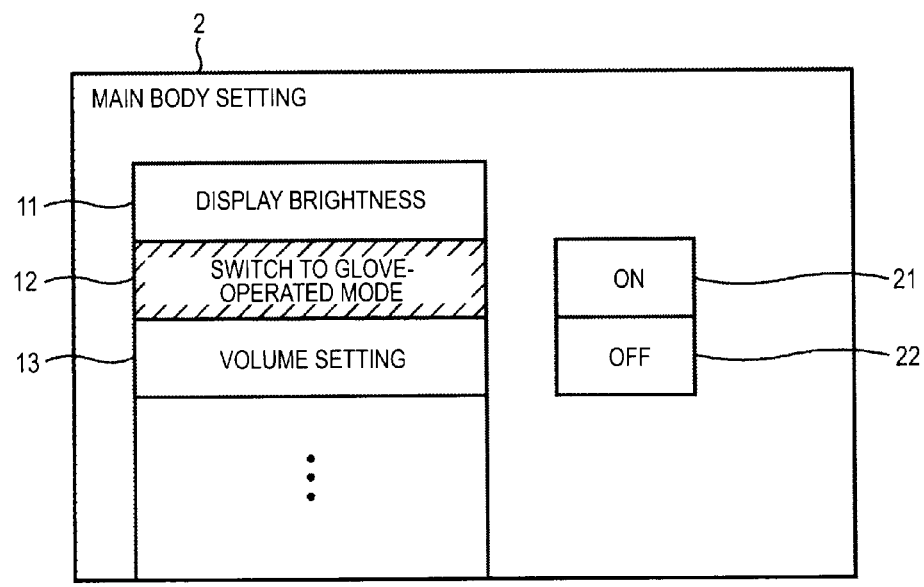
FIG. 6 is a diagram illustrating an example of a setting screen.

FIG. 6 is a diagram illustrating an example of the setting screen.

The main body setting screen illustrated in FIG. 6 is displayed on the display 2, for example, when the power of the information processing device 1 is turned on, and then, the user instructs a display of the menu screen and selects an item of the main body setting from various items displayed on the menu screen.

On the left side of the main body setting screen illustrated in FIG. 6, a button 11 that is operated in a case where an item of brightness adjustment of display is selected, a button 12 that is operated in a case where an item of switching to the glove-operated mode is selected, and a button 13 that is operated in a case where an item of volume setting is selected are represented.

In this state, for example, when the user touches the button 12 with his or her finger (when the touch event is detected), an On button 21 and an Off button 22 are displayed to the right side of the button 12. The On button 21 sets the glove-operated mode to be On and is a button operated for setting the glove-operated mode as the operation mode. On the other hand, the Off button 22 sets the glove-operated mode to be Off and is a button operated in a case where the normal mode is set as the operation mode. The user can set the glove-operated mode by touching the On button 21 with his or her finger, and can set the normal mode by touching the Off button 22 with his or her finger.

Figure 7:
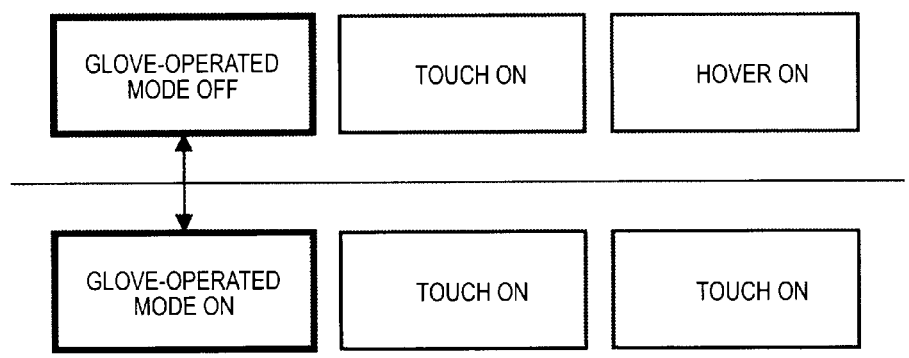
FIG. 7 is a diagram illustrating an example of switching between effective events.

FIG. 7 is a diagram illustrating an example of switching between effective events.

In a case where the operation mode is the normal mode (the glove-operated mode is Off), there are two effective events including the hover event and the touch event. The user can allow the information processing device 1 to detect the hover event and the touch event.

On the other hand, in a case where the operation mode is the glove-operated mode (the glove-operation mode is On), the hover event becomes ineffective, and only the touch event is effective. Since only the touch event is effective, even in a case where the user's finger is located at a position at which the hover event is detected in the normal mode, the same process as that of a case where the touch event is detected is performed.

In other words, in a case where the operation mode is the glove-operated mode, the hover event is recognized as the touch event by the information processing device 1. Accordingly, even in a state in which a user wears the glove, the user can perform the same operation as that performed in case where a bare finger is touching the front face of the display 2 by allowing the finger to approach the front face without directly touching the display 2 with the finger.

[Internal Configuration of Information Processing Device]

Figure 8:
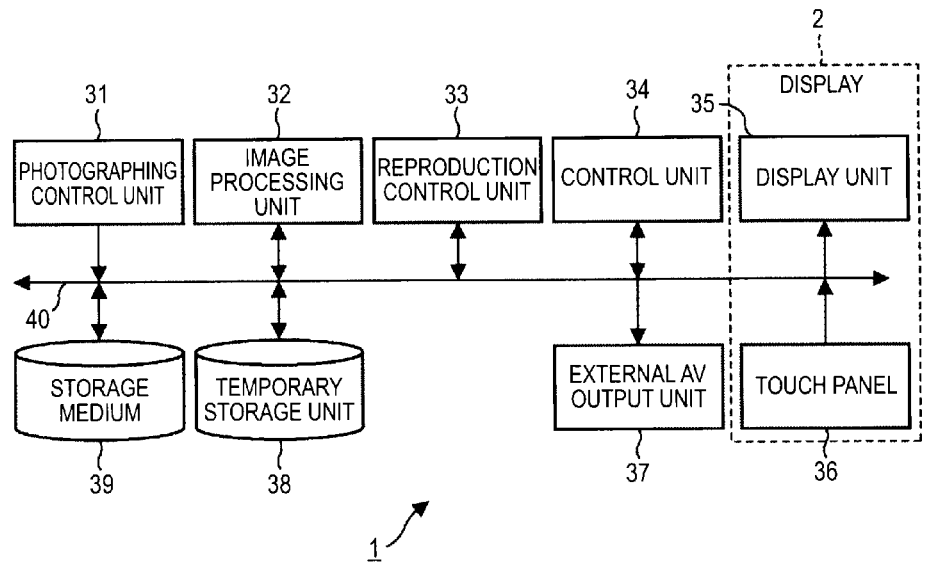
FIG. 8 is a block diagram illustrating an example of the internal configuration of the information processing device.

FIG. 8 is a block diagram illustrating an example of the internal configuration of the information processing device 1.

The information processing device 1 is configured by interconnecting a photographing control unit 31, an image processing unit 32, a reproduction control unit 33, a control unit 34, a display unit 35, a touch panel 36, an external AV output unit 37, a temporary storage unit 38, and a storage medium 39 through a bus 40. The display 2 is configured by the display unit 35 and the touch panel 36.

The photographing control unit 31 is configured by an imaging device such as a CMOS (Complementary Metal Oxide Semiconductor) and outputs image data that is acquired by performing photoelectric conversion, A/D conversion, and the like for light received through a lens to the image processing unit 32.

The image processing unit 32 performs various processes such as a correction process, a compression process, and the like for the image data supplied from the photographing control unit 31 and stores image data acquired by performing the various processes in the storage medium 39.

In a case of being instructed to reproduce an image that has been photographed, the reproduction control unit 33 reads out image data of which the reproduction is instructed from the storage medium 39 and performs a reproduction process such as a decoding process for the read-out image data. The reproduction control unit 33 outputs data acquired by the reproduction process to the display unit 35, thereby displaying an image.

The control unit 34 is configured by a CPU (Central Processing Unit), a ROM (Read Only Memory), and the like. The control unit 34 expands a program stored in the ROM into the temporary storage unit 38 and executes the program, thereby controlling the overall operation of the information processing device 1. The control unit 34, for example, detects an event based on a signal supplied from the touch panel 36 and performs a process in accordance with the detected event. In addition, the control unit 34 sets any one of the glove-operated mode and the normal mode as the operation mode of the information processing device 1 and changes the effectiveness or ineffectiveness of the event in accordance with the set mode.

The display unit 35 is configured by an LCD (Liquid Crystal Display) or the like and displays an image reproduced by the reproduction control unit 33, a menu screen, or the like under the control of the control unit 34.

The touch panel 36 is a capacitive-type touch panel and is disposed so as to overlap the display unit 35. The touch panel 36 detects a value of the electrostatic capacity at each position on the display 2 with a predetermined period and outputs a signal (detection signal) representing the value of the electrostatic capacity at each position to the control unit 34.

In a case where image data acquired through the reproduction process is supplied from the reproduction control unit 33, the external AV output unit 37 outputs the supplied image data through an HDMI (High Definition Multimedia Interface) cable or the like to an external device.

The temporary storage unit 38 is configured by a RAM (Random Access Memory) and stores data that is necessary for the process of each unit therein. In the temporary storage unit 38, for example, information that indicates whether the operation mode is the glove-operated mode or the normal mode and the like is stored.

The storage medium 39 is configured by a flash memory or the like and stores the image data that is photographed by the photographing control unit 31 and is processed by the image processing unit 32 therein.

Figure 9:
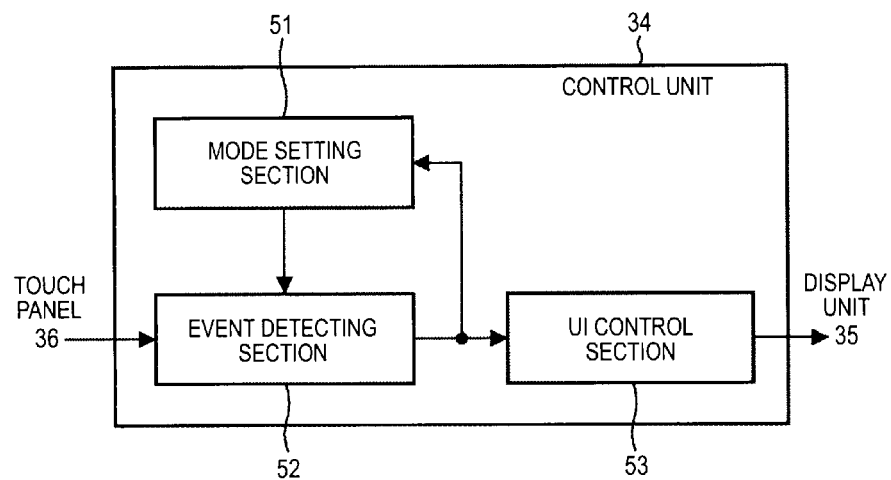
FIG. 9 is a block diagram illustrating an example of the functional configuration of a control unit.

FIG. 9 is a block diagram illustrating an example of the functional configuration of the control unit 34. At least a part of the functional units illustrated in FIG. 9 is realized by the CPU of the control unit 34 executing a predetermined program.

In the control unit 34, a mode setting section 51, an event detecting section 52, and a UI control section 53 are realized.

The mode setting section 51 sets an operation mode in accordance with a user's operation and outputs information representing the current operation mode to the event detecting section 52. For example, the mode setting section 51 sets the normal mode as a default operation mode. When an instruction to switch from the normal mode to the glove-operated mode based on the information supplied from the event detecting section is detected, the mode setting section 51 sets the glove-operated mode. The information representing the operation mode set by the mode setting section 51 is also supplied to the temporary storage unit 38 so as to be stored therein.

The event detecting section 52 detects an event based on a signal supplied from the touch panel 36 and outputs information representing the detected event together with information that represents a position on the display 2 at which the event is detected. The information output from the event detecting section 52 is supplied to the mode setting section 51 and the UI control section 53.

Figure 10:
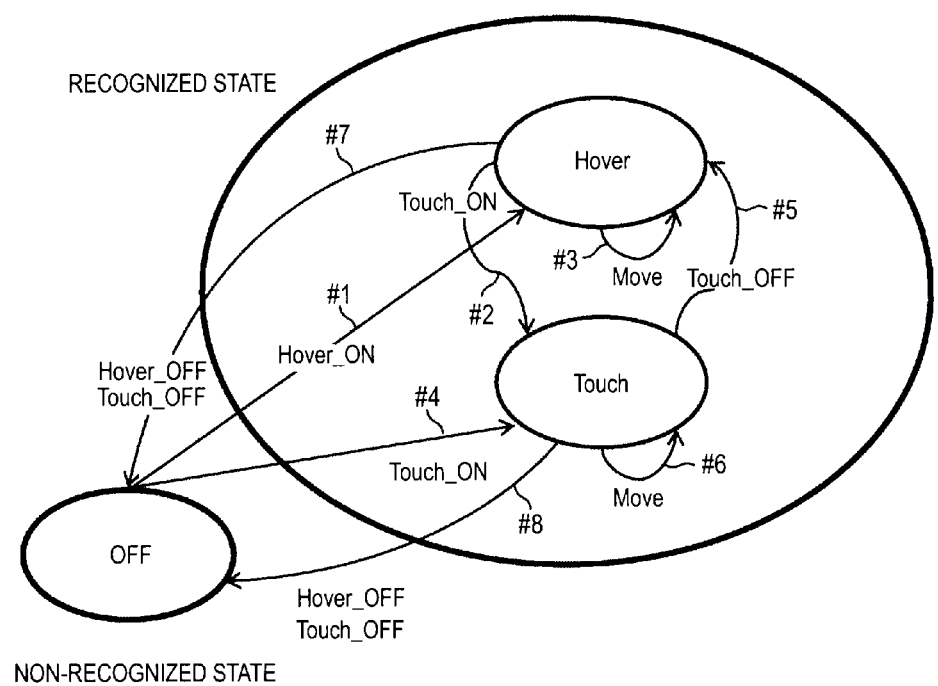
FIG. 10 is a diagram illustrating an example of transitions of events in a case where a normal mode is set.

FIG. 10 is a diagram illustrating an example of transitions of events in a case where the normal mode is set.

For example, in the Off state, in a case where the distance to the user's finger, which is represented by the signal supplied from the touch panel 36, is shorter than the threshold value th1, Hover_On is determined, and, as denoted by arrow #1, a state is formed in which a hover event is detected.

In addition, in the hover event state, in a case where the user's finger is represented to be touching the display 2 based on the signal supplied from the touch panel 36, Touch_On is determined, and, as denoted by arrow #2, a state is formed in which the touch event is detected.

In the hover event state, in a case where the distance to the user's finger, which is represented by the signal supplied from the touch panel 36, is shorter than the threshold value th1, Move is determined, and, as denoted by arrow #3, a state is formed in which the hover event is detected.

On the other hand, in the Off state, in a case where the user's finger is represented to be touching the display 2 based on the signal supplied from the touch panel 36, Touch_On is determined, and, as denoted by arrow #4, a state is formed in which the touch event is detected. In a case where the user suddenly touches the front face of the display 2 until the next sampling is performed after sampling of the electrostatic capacity is performed by the touch panel 36 at a predetermined position on the display 2, a transition is made directly from the Off state to the touch event state.

In the touch event state, in a case where the distance to the user's finger from the front face of the display 2, which is represented by the signal supplied from the touch panel 36, is increased but is shorter than the threshold value th1, Touch_Off is determined, and, as denoted by arrow #5, a state is formed in which a hover event is detected.

In the touch event state, in a case where the user's finger is represented to be touching the display 2 based on the signal supplied from the touch panel 36, Move is determined, and, as denoted by arrow #6, a state is formed in which the touch event is detected.

In the hover event state or the touch event state, in a case where the distance to the user's finger, which is represented by the signal supplied from the touch panel 36, is longer than the threshold value th1, Hover_Off and Touch_Off are determined, and, as denoted by arrows #7 and #8, an Off state is detected.

In a case where the normal mode is set as the operation mode, events are detected through the transitions described above by the event detecting section 52. In a case where the hover event is detected, information representing the event is output together with the position information, and, in a case where the touch event is detected, information representing the event is output together with the position information.

Figure 11:
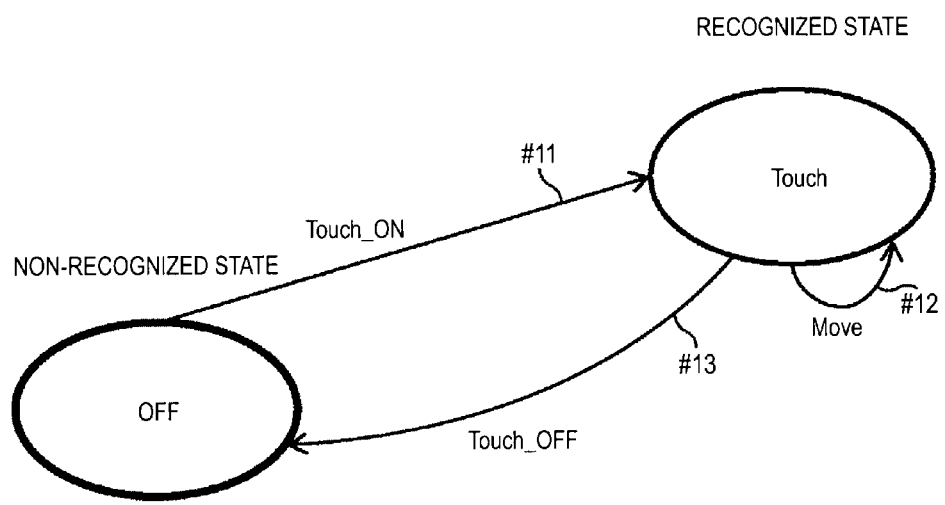
FIG. 11 is an example of transitions of events in a case where a glove-operated mode is set.

FIG. 11 is an example of transitions of events in a case where the glove-operated mode is set.

For example, in the Off state, in a case where the distance to the user's finger, which is represented by the signal supplied from the touch panel 36, is shorter than the threshold value th1 or in a case where the user's finger is touching the display 2, Touch_On is determined, and, as denoted by arrow #11, a state is formed in which a touch event is detected.

In the touch event state, in a case where the user's finger is represented to be touching the display 2 based on the signal supplied from the touch panel 36, or in a case where the distance to the user's finger from the front face of the display 2 is increased but is shorter than the threshold value th1, as denoted by arrow #12, a state is formed in which a touch event is detected.

In the touch event state, in a case where the distance to the user's finger, which is represented by the signal supplied from the touch panel 36, is longer than the threshold value th1, Touch_Off is determined, and, as denoted by arrow #13, an Off state is detected.

Referring back to FIG. 9, the UI control section 53 controls the display of the display unit 35 in accordance with the event state represented by the information supplied from the event detecting section 52.

For example, in a case where a hover event is detected in the normal mode, the UI control section 53 displays a predetermined image such as a circular shadow or the like that represents the approach of the user's finger at a position that the user's finger approaches. The display position of the image representing the position that the user's finger approaches is changed in accordance with the movement of the user's finger. On the other hand, in a case where a touch event is detected, the UI control section 53 determines that a button displayed at a position touched by the user is pressed and performs a predetermined process of changing the color of the button or the like.

[Operation of Information Processing Device]

Figure 12:
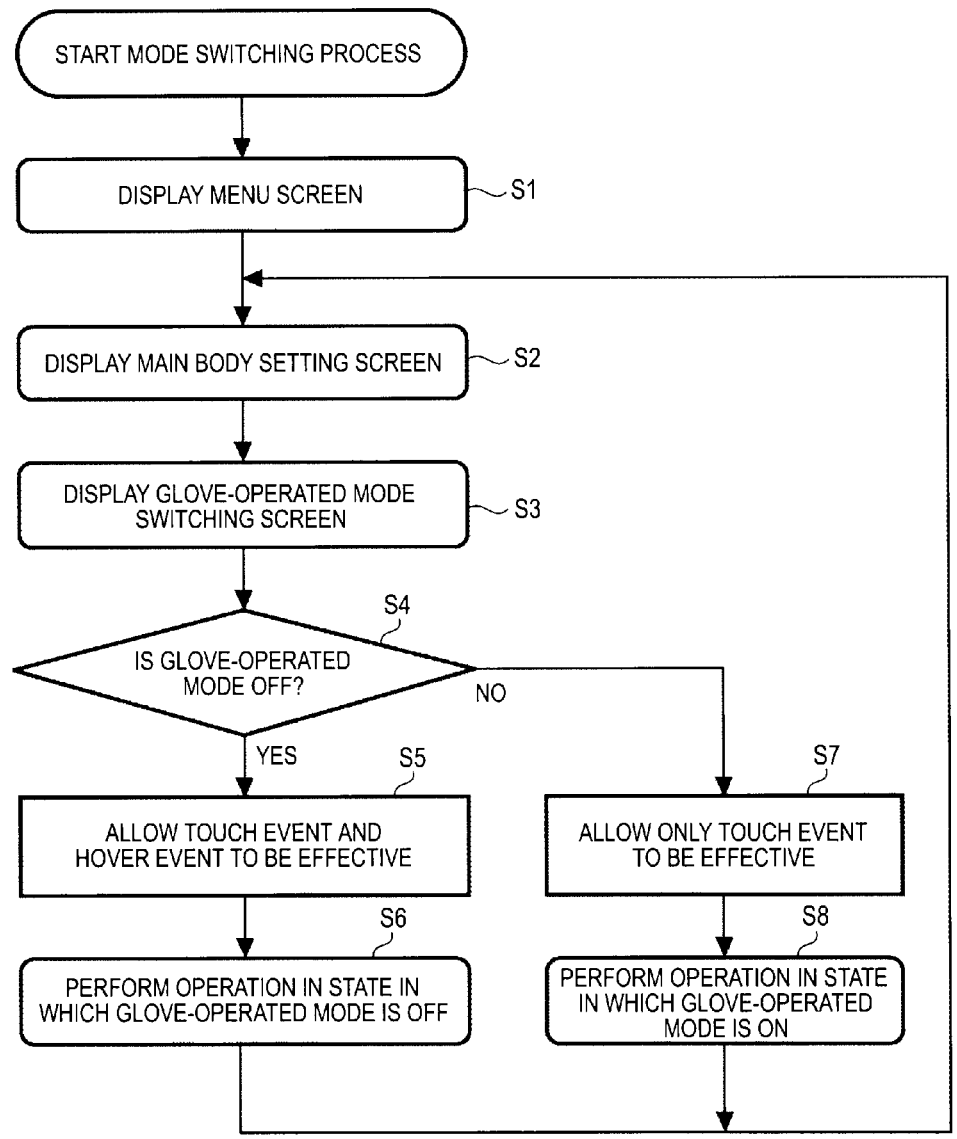
FIG. 12 is a flowchart illustrating an operation mode switching process of the information processing device.

Here, the operation of the information processing device 1 will be described. First, the process of switching between the operation modes that are performed by the information processing device 1 will be described with reference to a flowchart illustrated in FIG. 12. The process illustrated in FIG. 12 is started when a user turns on the power of the information processing device 1 and instructs the information processing device 1 to display a menu screen.

In Step S1, the UI control section 53 displays a menu screen on the display unit 35. On the menu screen, buttons are displayed which can be operated by detecting a touch event and are operated in a case where various items are to be selected.

When an item for main body setting is selected from among the items displayed on the menu screen, in Step S2, the UI control section 53 displays a main body setting screen as descried with reference to FIG. 6.

When an item for switching to a glove-operated mode is selected from among the items displayed on the main body setting screen, in Step S3, the UI control section 53 displays a glove-operated mode switching screen on which an On button 21 operated in a case where the glove-operated mode is set and an Off button 22 operated in a case where the normal mode is set are displayed.

In Step S4, the mode setting section 51 determines whether or not the glove-operated mode is Off, in other words, the normal mode is set.

For example, in a case where the normal mode is determined to have been set in Step S4 based on detection of a touch event at the display position of the Off button 22, in Step S5, the event detecting section 52 allows a touch event and a hover event to be effective.

After the touch event and the hover event become effective, an operation is performed in the state in Step S6. The user can operate the information processing device 1 by allowing a touch event or a hover event to be detected. In Step S6, the process of the normal mode is performed, and after the UI control section 53 is instructed to display the main body setting screen again, the process is returned to Step S2, and the above-described process is repeated.

On the other hand, not the normal mode but the glove-operated mode is determined to have been set in Step S4, in Step S7, the event detecting section 52 allows only a touch event to be effective.

After the touch event becomes effective, in Step S8, an operation in the state is performed. Even in a case where a user wears a glove, the user can allow a touch event to be detected by using only the finger approaching the display 2, and whereby the information processing device 1 can be operated. In Step S8, the process in the glove-operated mode is performed, and, after the UI control section 53 is instructed to display the main body setting screen again, the process is returned to Step S2, and the above-described process is repeated.

Figure 13:
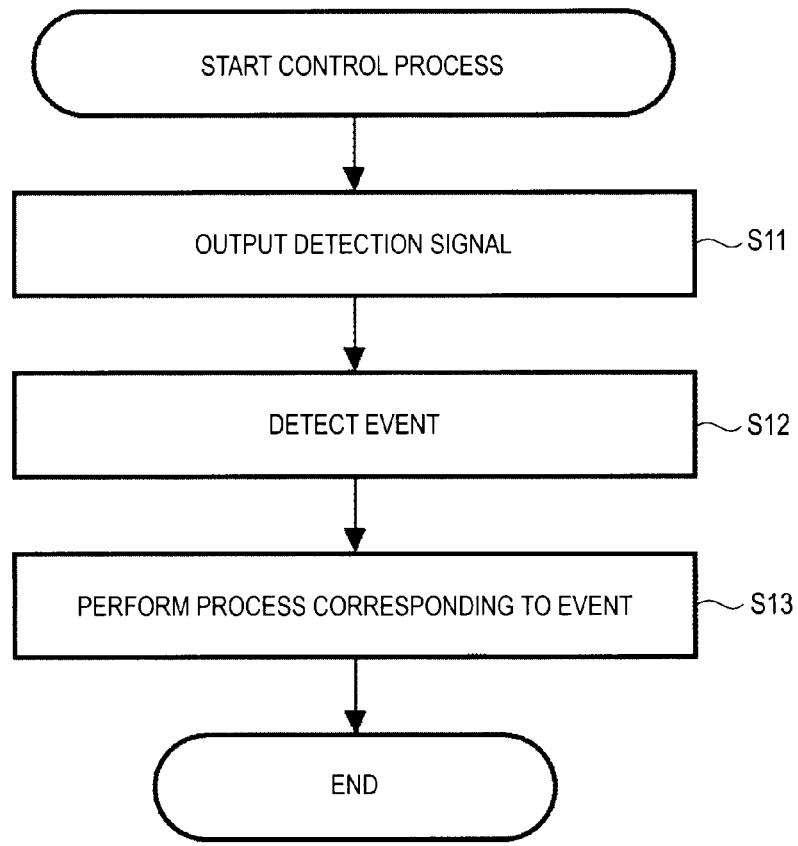
FIG. 13 is a flowchart illustrating a control process of the information processing device.

Next, the control process of the information processing device 1 that is performed in accordance with a user operation will be described with reference to a flowchart illustrated in FIG. 13.

In Step S11, the touch panel 36 detects the value of electrostatic capacity at each position of the display 2 with a predetermined period and outputs a signal that represents the value of the electrostatic capacity at each position.

In Step S12, in a case where the operation mode is the normal mode, the event detecting section 52 detects an event as described with reference to FIG. 10 based on the signal supplied from the touch panel 36. On the other hand, in a case where the operation mode is the glove-operated mode, the event detecting section 52 detects an event as described with reference to FIG. 11.

In Step S13, the UI control section 53 controls the display of the display unit 35 in accordance with the event detected by the event detecting section 52. Thereafter, the process ends.

As described above, by distinctively detecting a touch event and a hover event as being effective in the normal mode, the information processing device 1 can perform different processes in a case where the user's finger is touching the display 2 and a case where the user's finger is adjacent to the display 2. Thus, differently from a general device having a touch panel as an input interface, by adding not only a touch event but also a hover event, a broad range of functions can be implemented.

In addition, a higher priority level is given to a touch event in the glove-operated mode, and an operation that is detected as a hover event in the normal mode is detected as a touch event. Accordingly, a user wearing a glove can perform an operation while wearing the glove.

Furthermore, by preparing an item for switching to the glove-operated mode on the main body setting screen, a user can intentionally switch to the normal more or the glove-operated mode.

Second Embodiment

In the description presented above, although the events that can be detected by the information processing device 1 are a touch event and a hover event, another event may be configured to be additionally detectable. The configuration of the information processing device 1 is the same as that described with reference to FIGS. 8 and 9.

Figure 14:
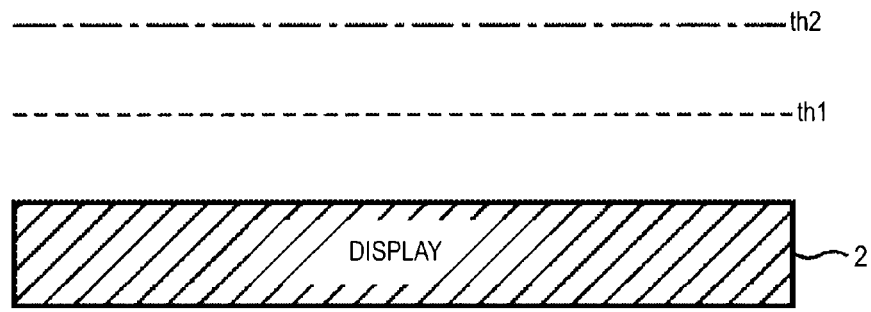
FIG. 14 is another cross-sectional view illustrating the vicinity of the front face of a display.

FIG. 14 is another cross-sectional view illustrating the vicinity of the front face of the display 2. In the example illustrated in FIG. 14, a threshold value th2 is set at a position that is farther than the threshold value th1 from the front face of the display 2 as a reference.

FIGS. 15A to 15D are diagrams illustrating another example of events that can be detected in the information processing device 1.

In the information processing device 1, in a case where the operation mode is the normal mode, in addition to the hover event and the touch event, a proximity event can be detected. The events illustrated in FIGS. 15A to 15D are the same as those illustrated in FIGS. 3A to 3C except that the proximity event is added.

Figure 15A:
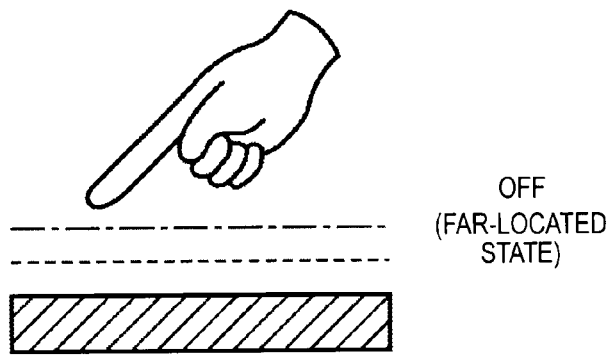
FIGS. 15A to 15D are diagrams illustrating another example of events that can be detected in the information processing device.

In other words, in a case where a distance to a user's finger that is represented by a signal output from the touch panel 36 is longer than the threshold value th2, an Event Off is determined in the information processing device 1 (FIG. 15A).

Figure 15B:
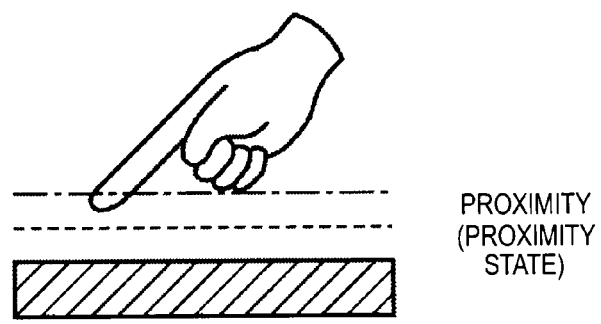

On the other hand, in a case where the distance to the user's finger that is represented by a signal output from the touch panel is longer than the threshold value th1 and is shorter than the threshold value th2, a proximity event is detected in the information processing device 1 (FIG. 15B).

Figure 15C:
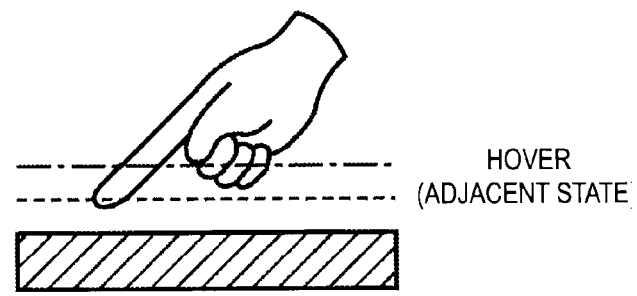

On the other hand, in a case where the distance to the user's finger that is represented by a signal output from the touch panel is shorter than the threshold value th1 although the user's finger is not touching the front face of the display 2, the hover event is detected in the information processing device 1 (FIG. 15C).

Figure 15D:
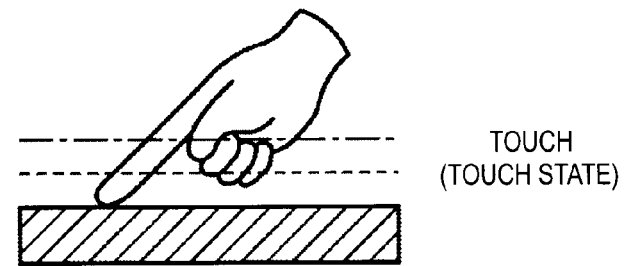

On the other hand, in a case where the position of the user's finger, which is represented by a signal output from the touch panel, is on the front face of the display 2, in other words, in a case where the user's finger is touching the display 2, a touch event is detected in the image processing device 1 (FIG. 15D).

The state of the user's finger at the time of a proximity event is represented in FIG. 16. The proximity event represents that the user's finger is in a proximity state (the user's finger is located farther away than that in the adjacent state but is not located far away). In such a case, the information processing device 1 can recognize the presence of a charged object such as a user's finger above the display 2. The state of the user's finger at each event represented in FIG. 16 other than the proximity event is the same as that described with reference to FIG. 5.

As described above, effective events are changed between a case where the normal mode is set as the operation mode and a case where the glove-operated mode is set as the operation mode. However, the proximity event is allowed to be effective in any operation mode.

Figure 17:
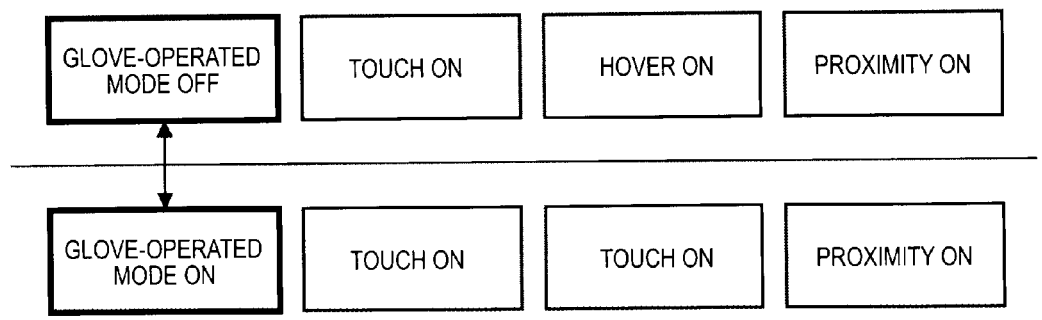
FIG. 17 is a diagram illustrating an example of switching between effective events.

FIG. 17 is a diagram illustrating an example of switching between effective events.

In a case where the operation mode is the normal mode (in a case of glove-operated mode Off), three events including the hover event, the touch event, and the proximity event are effective. Thus, the user can allow each event to be detected by the information processing device 1.

In a case where the operation mode is the glove-operated mode (in a case of glove-operated mode On), the hover event is ineffective, and the touch event and the proximity event are effective. Even in a case where the user's finger is located at a position at which the hover event is detected in the normal mode, the same process as that of a case where the touch event is detected is performed.

By setting the glove-operated mode, even in a state in which a user wears the glove, the user can perform the same operation as that performed in case where a bare finger is touching the front face of the display 2 by allowing the finger to approach the front face without directly touching the display 2 with the finger. In addition, by having the finger to approach a position located farther than a position at which a touch event is recognized, the presence of the finger above the display 2 can be recognized.

Although the coordinate point is difficult to recognize in the proximity event, it can be recognized that a charged object is in the proximity state. Accordingly, an approximate coordinate point can be recognized in the hover event. By assigning and implementing different functions for both the events, the user can perform a process for each event.

Figure 18:
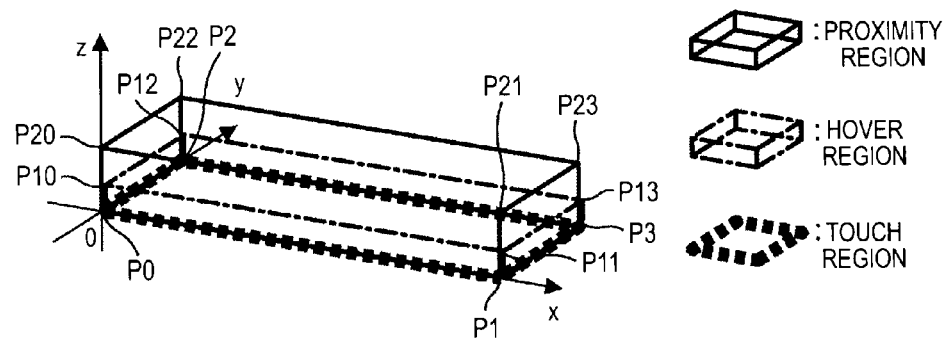
FIG. 18 is a diagram illustrating a detectable range of each event when the normal mode is set.

FIG. 18 is a diagram illustrating a detectable range of each event when the normal mode is set.

It is assumed that a range surrounded by an origin point P0 ((x,y,z)=(0,0,0)), a point P1 ((x,y,z)=(x1,0,0)), a point P2 ((x,y,z)=(0,y1,0)), and a point P3 ((x,y,z)=(x1,y1,0)) is the range of the front face of the display 2 for the description.

In such a case, a touch region in which a touch event can be detected is a range on a face, which is denoted by a dotted line, surrounded by points P0, P1, P2, and P3, which is the same as the area of the front face of the display 2.

In addition, a hover region in which a hover event can be detected is, within the range of a rectangular parallelepiped having a face surrounded by the points P0, P1, P2, and P3 as its bottom face and has a face surrounded by points P10, P11, P12, and P13 that are denoted by a dashed-dotted line as its top face, an area above the bottom face. The point P10 is represented as (x,y,z)=(0,0,th1), and the point P11 is represented as (x,y,z)=(x1,0,th1). In addition, the point P12 is represented as (x,y,z)=(0,y1,th1), and the point P13 is represented as (x,y,z)=(x1,y1,th1).

In addition, a proximity region in which a proximity event can be detected is within the range of a rectangular parallelepiped having a face surrounded by points P10, P11, P12, and P13 as its bottom face and has a face surrounded by points P20, P21, P22, and P23 that are denoted by a solid line as its top face. The point P20 is represented as (x,y,z)=(0,0,th2), and the point P21 is represented as (x,y,z)=(x1,0,th2). In addition, the point P22 is represented as (x,y,z)=(0,y1,th2), and the point P23 is represented as (x,y,z)=(x1,y1,th2).

Figure 19:
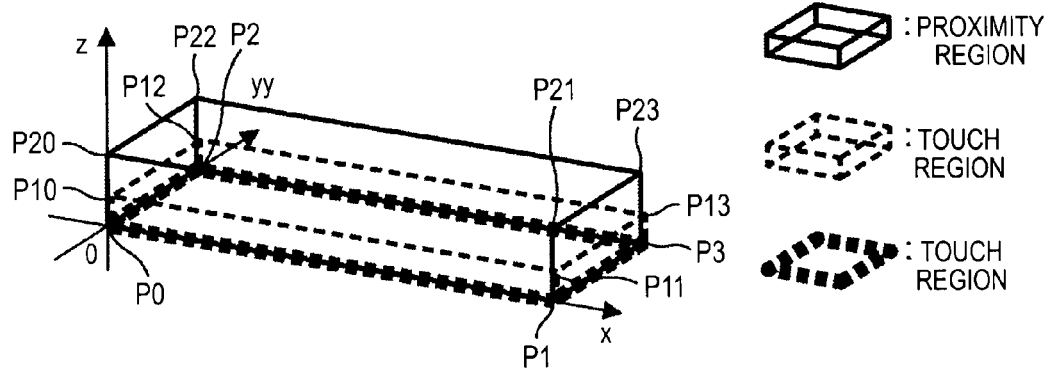
FIG. 19 is a diagram illustrating a detectable range of each event when the glove-operated mode is set.

FIG. 19 is a diagram illustrating a detectable range of each event when the glove-operated mode is set.

Since a hover event is recognized as a touch event in the normal mode, the touch region is within the area of a rectangular parallelepiped that has a face surrounded by the points P0, P1, P2, and P3 as its bottom face and has a face surrounded by the points P10, P11, P12, and P13 as its top face.

A range in which the proximity event can be detected is within the area of a rectangular parallelepiped that has a face surrounded by the points P10, P11, P12, and P13 as its bottom face and has a face surrounded by the points P20, P21, P22, and P23 as its top face.

Figure 20:
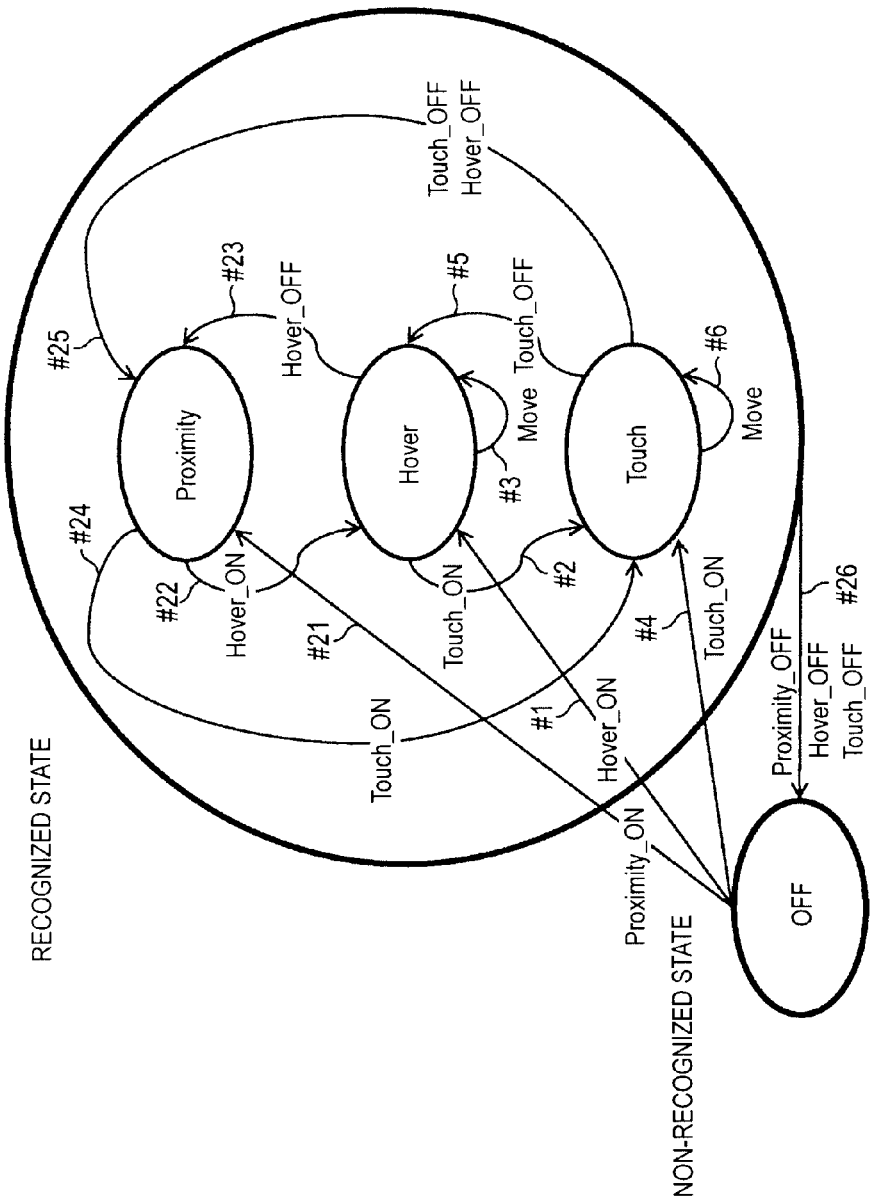
FIG. 20 is a diagram illustrating an example of transitions of events in a case where the normal mode is set.

FIG. 20 is a diagram illustrating an example of transitions of events in a case where the normal mode is set. The description that is the same as that presented with reference with FIG. 10 will not be presented here.

In the Off state, in a case where the distance to the user's finger that is represented by a signal supplied from the touch panel 36 is longer than the threshold value th1 and is shorter than the threshold value th2, Proximity_On is determined, and, as denoted by arrow #21, a state is formed in which a proximity event is detected.

In the proximity event state, in a case where the distance to the user's finger, which is represented by the signal supplied from the touch panel 36, is shorter than the threshold value th1, Hover_On is determined, and, as denoted by arrow #22, a state is formed in which a hover event is detected.

In the hover event state, in a case where the distance to the user's finger, which is represented by the signal supplied from the touch panel 36, is longer than the threshold value th1 and is shorter than the threshold value th2, Hover_Off is determined, and, as denoted by arrow #23, a state is formed in which a proximity event is detected.

In the proximity event state, in a case where the user's finger is represented to be touching the display 2 based on the signal supplied from the touch panel 36, Touch_On is determined, and, as denoted by arrow #24, a state is formed in which the touch event is detected.

In the touch event state, in a case where the distance to the user's finger, which is represented by the signal supplied from the touch panel 36, is longer than the threshold value th1 and is shorter than the threshold value th2, Touch_Off and Hover_Off are determined, and, as denoted by arrow #25, a state is formed in which a proximity event is detected.

In the proximity event state, the hover event state, or the touch event state, in a case where the distance to the user's finger, which is represented by the signal supplied from the touch panel 36, is longer than the threshold value th2, Proximity-Off, Hover_Off, and Touch_Off are determined, and, as denoted by arrow #26, an Off state is detected.

In a case where the normal mode is set, the events are detected through the above-described transitions by the event detecting section 52. In a case where the proximity event is detected, information representing the detection thereof is output, and, in a case where a hover event is detected, information representing the detection thereof is output together with position information. In addition, in a case where the touch event is detected, information representing the detection thereof is output together with position information.

Figure 21:
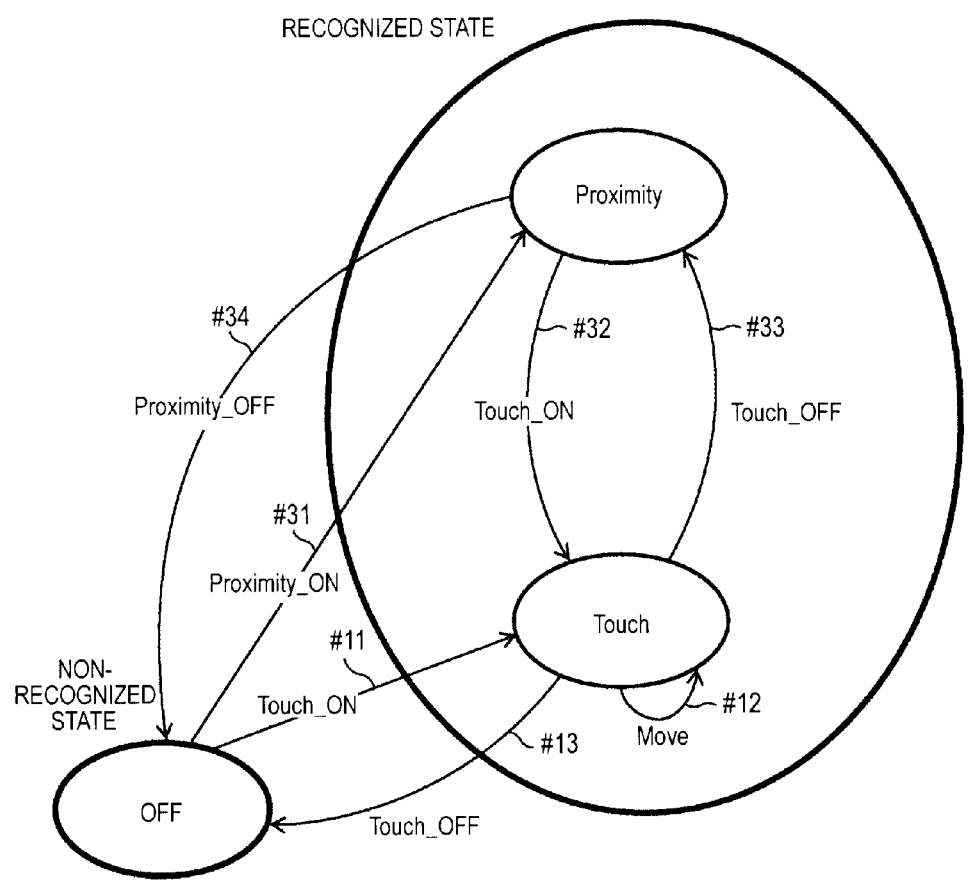
FIG. 21 is a diagram illustrating an example of transitions of events in a case where the glove-operated mode is set.

FIG. 21 is a diagram illustrating an example of transitions of events in a case where the glove-operated mode is set. The description that is the same as that presented with reference with FIG. 11 will not be presented here.

In the Off state, in a case where the distance to the user's finger that is represented by a signal supplied from the touch panel 36 is longer than the threshold value th1 and is shorter than the threshold value th2, Proximity_On is determined, and, as denoted by arrow #31, a state is formed in which a proximity event is detected.

In the proximity event state, in a case where the distance to the user's finger, which is represented by the signal supplied from the touch panel 36, is shorter than the threshold value th1 or in a case where the user's finger is touching the display 2, Touch_On is determined, and, as denoted by arrow #32, a state is formed in which a touch event is detected.

In the touch event state, in a case where the distance to the user's finger that is represented by a signal supplied from the touch panel 36 is longer than the threshold value th1 and is shorter than the threshold value th2, Touch_Off is determined, and, as denoted by arrow #33, a state is formed in which a proximity event is detected.

In the proximity event state, in a case where the distance to the user's finger, which is represented by the signal supplied from the touch panel 36, is longer than the threshold value th2, Proximity-Off is determined, and, as denoted by arrow #34, an Off state is detected.

Here, another process of the information processing device 1 for switching between the operation modes will be described with reference to a flowchart illustrated in FIG. 22.

Figure 22:
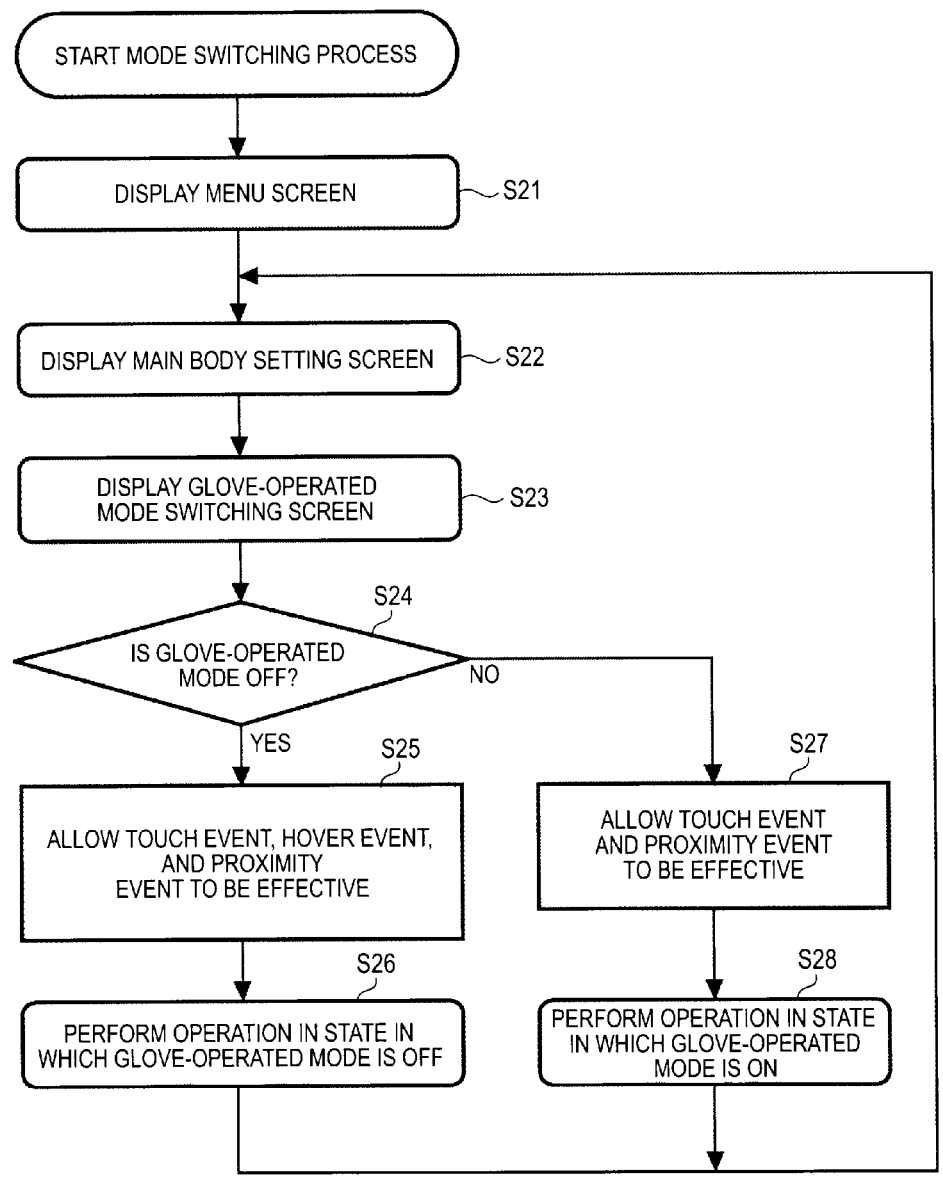
FIG. 22 is a flowchart illustrating another operation mode switching process of the information processing device.

The process illustrated in FIG. 22 is the same as that described with reference to FIG. 12 except that not only the touch event and the hover but also the proximity event is effective in the normal mode, and not only the touch event but also the proximity event is effective in the glove-operated mode. A duplicate description will not be presented here as is appropriate.

In Step S21, the UI control section 53 displays a menu screen on the display unit 35. When an item for main body setting is selected, in Step S22, a main body setting screen is displayed.

When the item for switching to the glove-operated mode is selected, in Step S23, the UI control section 53 displays a glove-operated mode switching screen.

In Step S24, the mode setting section 51 determines whether or not the glove-operated mode is Off, in other words, the normal mode is set.

In a case where the normal mode is determined to have been set in Step S24, in Step S25, the event detecting section 52 allows a touch event, a hover event, and a proximity event to be effective.

After the touch event, the hover event, and the proximity event become effective, an operation is performed in the state in Step S26. In Step S26, the process of the normal mode is performed, and after the UI control section 53 is instructed to display the main body setting screen again, the process is returned to Step S22, and the above-described process is repeated.

On the other hand, not the normal mode but the glove-operated mode is determined to have been set in Step S24, in Step S27, the event detecting section 52 allows a touch event and a proximity event to be effective.

After the touch event and the proximity become effective, in Step S28, an operation in the state is performed. In Step S28, the process in the glove-operated mode is performed, and, after the UI control section 53 is instructed to display the main body setting screen again, the process is returned to Step S22, and the above-described process is repeated.

Modified Examples

In a case where the touch panel 36 is a touch panel in which a touch operation for multiple points that are two or more points can be simultaneously performed, that is, a touch panel corresponding to a so-called multi-touch. A plurality of events may be simultaneously detected as above. In addition, it may be configured such that a user can switch between a multi-touch mode in which a multi-touch operation can be performed and a single touch mode in which a single touch operation can be performed.

Figure 23:
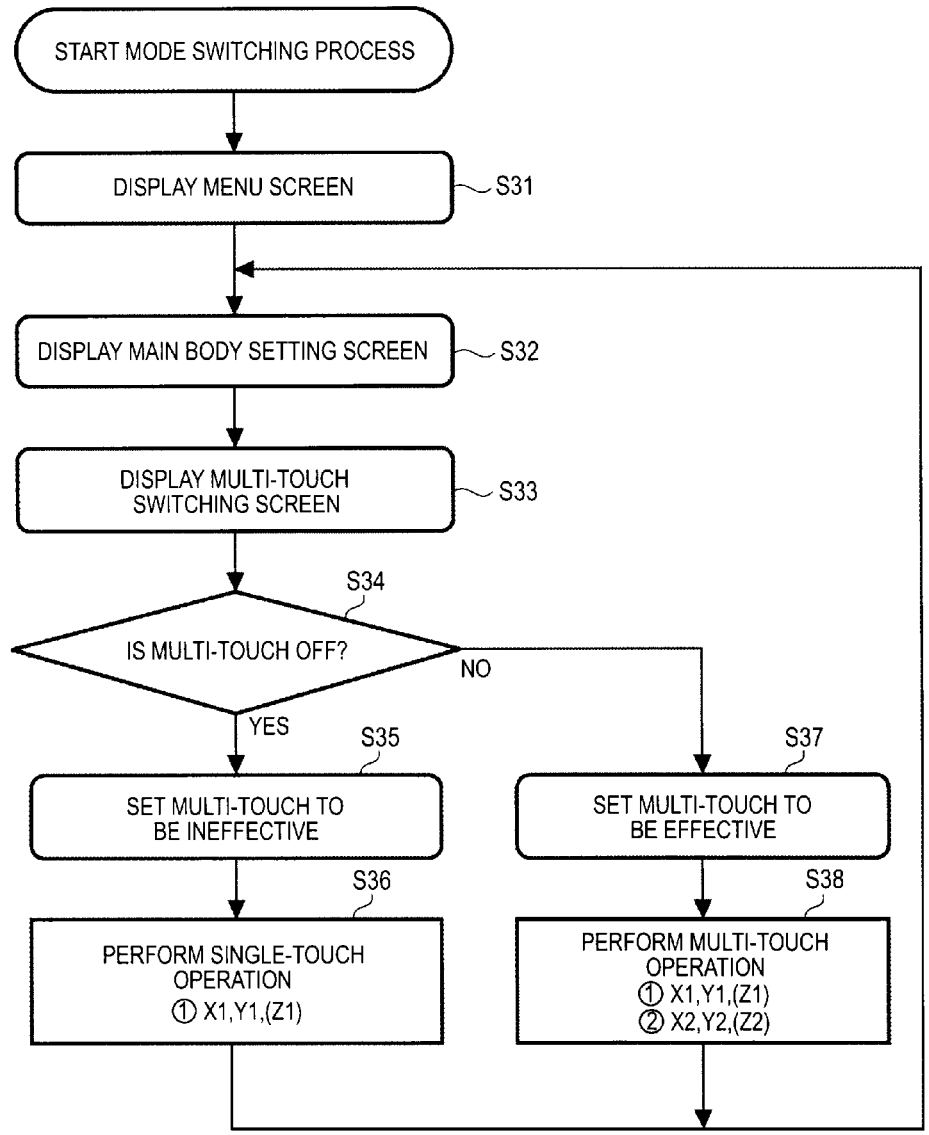
FIG. 23 is a flowchart illustrating a touch mode switching process of the information processing device.

The process of the information processing device 1 for switching between touch modes will be described with reference to a flowchart illustrated in FIG. 23. The switching between the touch modes is performed on the main body setting screen, similarly to the switching between the operation modes.

When being instructed to display a menu screen, in Step S31, the UI control section 53 displays a menu screen on the display unit 35.

When an item for main body setting is selected from among items displayed on the menu screen, in Step S32, the UI control section 53 displays a main body setting screen. On the main body setting screen, buttons operated in a case where various items relating to the main body setting are selected are displayed, and buttons operated in a case where an item for switching between the touch modes are included.

When the item for switching between the touch modes is selected, in Step S33, the UI control section 53 displays a multi-touch switching screen. On the multi-touch switching screen, a button operated in a case where the multi-touch mode is set and a button operated in a case where a single touch mode is set are displayed.

In Step S34, the mode setting section 51 determines whether or not the multi-touch is Off, in other words, the single touch mode is set.

In a case where the single touch mode is determined to have been set in Step S34, in Step S35, the event detecting section 52 sets a multi-touch to be ineffective.

After the multi-touch becomes ineffective, in Step S36, an event according to a user's operation that is performed through a single touch is detected, and an operation according to the detected event is performed. In Step S36, the process in the single touch mode is performed, after the UI control section 53 is instructed to display the main body setting screen again, the process is returned to Step S32, and the above-described process is repeated.

On the other hand, not the single touch mode but the multi-touch mode is determined to have been set in Step S34, in Step S37, the event detecting section 52 allows a multi-touch to be effective.

After the multi-touch becomes effective, in Step S38, an event according to a user's operation performed through a multi-touch is detected, and an operation according to the detected event is performed. In Step S38, the process in the multi-touch mode is performed, and, after the UI control section 53 is instructed to display the main body setting screen again, the process is returned to Step S32, and the above-described process is repeated.

By setting a multi-touch operation to be able to be performed, a user can perform a gesture operation in which, for example, an operation is performed by using a two-point touch manner or a two-point moving manner. When a gesture operation is performed, a process according to a touch manner or a moving manner is performed through the multi-point touch manner or a multi-point moving manner.

FIG. 24 is a diagram illustrating an example of an operation mode that is implemented in a case where On/Off of the glove-operated mode and On/Off of the multi-touch mode are combined.

For example, assuming that the events that can be detected by the information processing device 1 are a touch event and a hover event, in a case where the glove-operated mode is Off and the multi-touch mode is Off, the operation mode is the normal operation mode. The user performs an operation by allowing a touch event and a hover event to be detected through one finger.

On the other hand, in a case where the glove-operated mode is On, and the multi-touch mode is Off, the operation mode is the glove-operated mode in which a user can perform an operation on the hover region in the state of wearing the glove. The user performs an operation by allowing a touch event and a hover event to be detected through one finger. In addition, in a case where the glove-operated mode is On, and the multi-touch mode is On, the operation mode is an operation mode in which a multi-point operation can be performed on the hover region.

As above, by associating the information processing device 1 with a multi-touch operation, a user can perform a predetermined process or allow a gesture operation using multiple points to be recognized, for example, by allowing multiple points to be recognized in the hover region. In addition, the expansion of the function of the information processing device 1 can be realized.

As above, a case has been described in which the information processing device 1 is a digital camera. However, the above-described process can be applied to various devices having touch panels such as a cellular phone and a personal computer.

Configuration Example of Computer

The series of processes described above can be performed by hardware or software. In a case where the series of the processes are performed by software, a program configuring the software is installed to a computer that is built in dedicated hardware, a general computer, or the like from a program recording medium.

FIG. 25 is a block diagram illustrating an example of the hardware configuration of a computer that performs the series of the processes described above using a program.

A CPU (Central Processing Unit) 101, a ROM (Read Only Memory) 102, and a RAM (Random Access Memory) 103 are interconnected through a bus 104.

In addition, an input/output interface 105 is connected to the bus 104. To the input/output interface 105, an input unit 106 that is configured by a keyboard, a mouse, or the like and an output unit 107 that is configured by a speaker or the like are connected. In addition, to the input/output interface 105, a storage unit 108 that is configured by a hard disk, a non-volatile memory, or the like and a communication unit 109 that is configured by a network interface or the like, and a drive 110 that drives a removable medium 111 are connected.

In the computer configured as above, the CPU 101, for example, loads a program stored in the storage unit 108 into the RAM 103 through the input/output interface 105 and the bus 104 and executes the program, thereby performing the series of the processes described above.

The program executed by the CPU 101, for example, is provided by being recorded on the removable medium 111 or through a wired or wireless transmission medium such as a local area network, the Internet, or a digital broadcast and is installed into the storage unit 108.

In addition, the program executed by the computer may be a program that performs the process in time series in accordance with the sequence described as above, a program that performs the process in a parallel manner, or a program that performs the process at a necessary timing such as timing when the program is called.

Embodiments of the present disclosure are not limited to the embodiments described above, and various changes can be made therein within the scope not departing from the concept of the present disclosure.

The present disclosure contains subject matter related to that disclosed in Japanese Priority Patent Application JP 2010-287451 filed in the Japan Patent Office on Dec. 24, 2010, the entire content of which is hereby incorporated by reference.

What is claimed is:

1. An information processing device comprising:
a sensor; and
a processing circuit configured to:
control the sensor to detect a contact state of an external object, wherein in the contact state the external object is in contact with a surface of the information processing device;
control the sensor to detect an adjacent state of the external object, wherein in the adjacent state the external object is within a predetermined non-zero distance above the surface but not in contact with the surface;
switch an operation mode of the information processing device between a first operation mode and a second operation mode,
wherein the first operation mode is a mode in which the information processing device is operated by a first object, wherein in the first operation mode the sensor detects the contact state when the first object is in contact with the surface, and the second operation mode is a mode in which the information processing device is operated by a second object, wherein in the second operation mode the sensor does not detect the contact state when the second object is in contact with the surface, wherein
in the first operation mode, a first process corresponding to a touch event is performed based on detection of the contact state and a second process, different from the first process, corresponding to a hover event is performed based on detection of the adjacent state, and
in the second operation mode, the first process corresponding to the touch event of the first operation mode is performed based on detection of the adjacent state.

2. The information processing device of claim 1, wherein the first operation mode and the second operation mode are selectably enabled by the according to a selection by a user.

3. The information processing device of claim 1, wherein the adjacent state is a hover state in which the external object is moved to within a first predetermined non-zero distance from the surface.

4. The information processing device of claim 1, further comprising a display, wherein
the processing circuit controls the display in accordance with a state detected by the sensor.

5. The information processing device of claim 1, wherein the sensor detects the external object in a proximity state when the external object is between a first predetermined non-zero distance and a second predetermined non-zero distance from the surface.

6. The information processing device of claim 1, wherein the processing circuit further operates in a single-touch mode or a multi-touch mode.

7. The information processing device of claim 6, wherein the first operation mode and the second operation mode are enabled according to a selection by a user,
the single-touch mode and the multi-touch mode are enabled according to a selection by the user, and
when both the first operation mode and the single-touch mode are enabled, the processing circuit further operates in a common operation mode.

8. The information processing device of claim 6, wherein the first operation mode and the second operation mode are enabled according to a selection by a user,
the single-touch mode and the multi-touch mode are enabled according to a selection by the user, and
when both the first operation mode and the multi-touch mode are enabled, the processing circuit further operates in the multi-touch mode.

9. The information processing device of claim 6, wherein the first operation mode and the second operation mode are enabled according to a selection by a user,
the single-touch mode and the multi-touch mode are enabled according to a selection by the user, and
when both the second operation mode and the single-touch mode are enabled, the processing circuit further operates in a glove-operated mode.

10. The information processing device of claim 6, wherein the first operation mode and the second operation mode are enabled according to a selection by a user,
the single-touch mode and the multi-touch mode are enabled according to a selection by the user, and
when both the second operation mode and the multi-touch mode are enabled, the processing circuit further operates in a hover mode.

11. The information processing device of claim 1, further comprising a touch screen that includes the sensor.

12. The information processing device of claim 11, wherein the touch screen is incorporated into a smart phone or a tablet computer.

13. The information processing device of claim 1, further comprising a display, wherein
the display displays a first button corresponding to the first operation mode and a second button corresponding to the second operation mode,
the processing circuit processes a state detected by the sensor in the first operation mode when a user selects the first button, and
the processing circuit processes the state detected by the sensor in the second operation mode when the user selects the second button.

14. An information processing method comprising:
controlling a sensor to detect a contact state of an external object, wherein in the contact state the external object is in contact with a surface of an information processing device;
controlling the sensor to detect an adjacent state of the external object, wherein in the adjacent state the external object is within a predetermined non-zero distance above the surface but not in contact with the surface;
switching, by circuitry of the information processing device, an operation mode of the information processing device between a first operation mode and a second operation mode,
wherein the first operation mode is a mode in which the information processing device is operated by a first object, wherein in the first operation mode the sensor detects the contact state when the first object is in contact with the surface, and the second operation mode is a mode in which the information processing device is operated by a second object, wherein in the second operation mode the sensor does not detect the contact state when the second object is in contact with the surface, wherein
in the first operation mode, performing, by the circuitry, a first process corresponding to a touch event based on detection of the contact state and a second process, different from the first process, corresponding to a hover event based on detection of the adjacent state; and in the second operation mode, performing, by the circuitry, the first process corresponding to the touch event of the first operation mode based on detection of the adjacent state.

15. The method of claim 14, further comprising:
selectively enabling one of the first operation mode and the second operation mode; and
recognizing both the contact state and the adjacent state as the adjacent state when the second operation mode is enabled.

16. The method of claim 14, wherein
the adjacent state is a hover state in which the external object is moved to within a first predetermined non-zero distance from the surface.

17. The method of claim 14, further comprising controlling a display in accordance with a state detected by the sensor.

18. The method of claim 14, wherein the sensor is controlled to detect the external object in a proximity state in which the external object is between a first predetermined non-zero distance and a second predetermined non-zero distance from the surface.

19. The method of claim 14, further comprising:
displaying, by a display, a first button corresponding to the first operation mode and a second button corresponding to the second operation mode;
processing, by the circuitry, a state detected by the sensor in the first operation mode when a user selects the first button; and
processing, by the circuitry, the state detected by the sensor in the second operation mode when the user selects the second button.

20. A non-transitory computer-readable medium having computer-executable instructions stored thereon that, when executed by a processing circuit of an information processing device, causes the processing circuit to:
control a sensor to detect a contact state of an external object, wherein in the contact state the external object is in contact with a surface of the information processing device;
control the sensor to detect an adjacent state of the external object, wherein in the adjacent state the external object is within a predetermined non-zero distance above the surface but not in contact with the surface;
switch an operation mode of the information processing device between a first operation mode and a second operation mode,
wherein the first operation mode is a mode in which the information processing device is operated by a first object, wherein in the first operation mode the sensor detects the contact state when the first object is in contact with the surface, and the second operation mode is a mode in which the information processing device is operated by a second object, wherein in the second operation mode the sensor does not detect the contact state when the second object is in contact with the surface, wherein
in the first operation mode, a first process corresponding to a touch event is performed based on detection of the contact state and a second process, different from the first process, corresponding to a hover event is performed based on detection of the adjacent state, and
in the second operation mode, the first process corresponding to the touch event of the first operation mode is performed based on detection of the adjacent state.

\* \* \* \* \*